United States Patent [19]

Rudland

[11] Patent Number: 4,678,898
[45] Date of Patent: * Jul. 7, 1987

[54] IDENTIFICATION CARD WITH IMPROVED CONCEALED CODING AND AN OPTICAL SWIPE READER HOUSING FOR USE WITH IT

[75] Inventor: Peter E. Rudland, Broadstone, England

[73] Assignee: Time and Data Systems International Limited, Poole, England

[*] Notice: The portion of the term of this patent subsequent to Aug. 27, 2002 has been disclaimed.

[21] Appl. No.: 657,670

[22] Filed: Oct. 4, 1984

[30] Foreign Application Priority Data

Oct. 7, 1983 [GB] United Kingdom ............. 8326874

[51] Int. Cl.⁴ .................................................. G06K 7/10
[52] U.S. Cl. .................................. 235/468; 235/462; 235/466; 235/487; 235/464
[58] Field of Search .............. 235/468, 466, 462, 487, 235/494; 360/2

[56] References Cited

U.S. PATENT DOCUMENTS

| | | | |
|---|---|---|---|
| 2,858,032 | 12/1974 | Scantlin . | |
| 3,802,101 | 4/1974 | Scantlin | 40/2.2 |
| 3,819,910 | 6/1974 | Scantlin . | |
| 3,875,375 | 4/1975 | Scuitto . | |
| 4,066,910 | 1/1978 | Swift | 250/555 |
| 4,237,624 | 12/1980 | Yeh | 360/2 |
| 4,254,441 | 3/1981 | Fisher | 360/2 |
| 4,406,629 | 9/1983 | Yeh | 360/2 |
| 4,538,059 | 8/1985 | Rudland | 235/462 |

FOREIGN PATENT DOCUMENTS 2009477 6/1979 United Kingdom .
1581624 12/1980 United Kingdom .
2108906 5/1983 United Kingdom .

Primary Examiner—Harold I. Pitts
Attorney, Agent, or Firm—Shoemaker and Mattare, Ltd.

[57] ABSTRACT

A concealed code of a card or badge arranged along a line parallel to one edge is read by advancing the card or badge along a slot defined between two internal chambers of a sensor housing that accomodate an infrared light-emitting diode and a phototransistor respectively. The two chambers are provided with holes disposed on opposite sides of the slot to facilitate a beam of infra-red radiation passing through the holes and across the slot to read the code embodied in the card or badge. The surface at the bottom of the slot slopes upwardly from the peripery of the housing to a point of maximum height midway through the slot that is immediately below the point at which the infra-red beam passes across the slot so that the beam reads the code even when the edge of the card 1 is slightly misaligned. The code is recorded with successive binary digits represented by transparent windows alternating with regions opaque to infra-red radiation, the said windows and opaque regions being arranged along a line parallel to one edge of the card, each window representing a binary digit of the code with one binary digit being represented by first generally rectangular windows of higher transmissivity and the other binary digit being represented by windows of substantially the same dimensions as the first windows but of lower transmissivity.

11 Claims, 9 Drawing Figures

IDENTIFICATION CARD WITH IMPROVED CONCEALED CODING AND AN OPTICAL SWIPE READER HOUSING FOR USE WITH IT

FIELD OF THE INVENTION

This invention relates to an instruction or identification card or badge, its use in a time recording system and to means for reading it using infra-red radiation.

BACKGROUND OF THE INVENTION

There are many applications in which it is necessary to confirm the identity of an individual. Such applications include the purchase of merchandise using a credit card, cashing cheques at banks or validation of cheques when used in payment for merchandise or service, admission to locations where only authorised personnel are allowed access, and the identification of users of a time-recording system employed for monitoring the times of arrival and departure of staff at a place of work.

In some of these applications it is necessary to ensure that the holder of such a card or any third party into whose hands it may pass as a result of theft or accidental loss, is unable to change the code embodied in or on the card and thereby gain unauthorised access or obtain merchandise dishonestly.

A considerable number of methods have been described for ensuring that the codes embodied in such cards cannot be altered without so drastically mutilating a card that it is no longer capable of being used. Among these methods are several in which the coding is concealed within the structure of the card making it invisible to the naked eye, while it remains detectable by one or more of a variety of techniques depending on, for example, magnetic interaction, radio-frequency coupling, radioactive effects, reflection or attenuation of infrared radiation or other physical phenomena.

A number of techniques have been described in which infra-red radiation is applied to one side of a composite card and a series of infra-red detectors located on the other side of the card respond to the presence or absence of a transmission path through the card at predetermined but visually hidden locations. Some such methods have been disclosed by Scuitto and Kramer in U.S. Pat. No. 3,875,375, by Lawrence Systems Inc. in U.S. Pat. No. 4,066,910, by Interflex Datensystem of Germany in U.K. Pat. No. 2,009,477, by E.M.I. Ltd. in U.K. Pat. No. 1,581,624 and by J. R. Scantlin of Transaction Technology Inc. in U.S. Pat. No. 3,858,032, 3,819,910 and 3,802,101.

Most of the above patents disclosed techniques in which several parallel tracks of data are scanned by a set of several photodetectors, one such track being used as a clock track, while the corresponding data bits on other tracks are either translucent to represent a binary digit ONE or opaque to represent a binary digit ZERO or vice versa.

The mechanisms used to transport the cards past the read-heads, and the parallel signal paths for the several read-heads to the associated digital electronic systems have various levels of complexity according to the details of the intended application.

In U.K. Patent Specification No. 2,108,906, a method has been disclosed of coding a card, in which all the data is located serially along a single track, which includes distinct symbols for both ONEs and ZEROs, and since neither of them is represented by an opaque area, positive clocking is inherent in the single track without any constraint on the rating of scanning. Since the scanning rate is not critical, it is possible to rely on manual presentation of the card to the reader and thereby to simplify the reader mechanism significantly. In the aforesaid U.K. Specification the two distinct symbols consist of windows typically 6 mm long measured across the direction of scan, and of two widths measured along the direction of scan, a width of 0.5 mm typically representing a "ONE" while a width of 0.2 mm typically represents a "ZERO". It has been found that tolerances in production of the windows in practice, while acceptable in the larger apertures are such as to cause problems with maintaining reliability in the smaller windows. It is an object of the present invention to remedy this difficulty.

SUMMARY OF THE INVENTION

Broadly stated, one aspect of the invention provides a card or badge for carrying concealed digital information for presentation to an electronic recognition device to cause said device to produce an authorisation signal denoting recognised information wherein digital information in the card is invisible to the naked eye when viewed in visible light but readable in transmission by an optoeletronic reader using infra-red radiation and is recorded by successive digits represnted by transparent or translucent windows alternating with regions opaque to infra-red radiation, the said windows and opaque regions being arranged along a line parallel to one edge of the card, each window representing a binary digit of the code with one binary digit being represented by first generally rectangular windows of higher transmissivity and the other binary digit being represented by second generally rectangular windows of substantially the same dimensions as the first windows but whose transmission is lower. Reduction of the light transmissivity may be by the application of a semi-transparent film or by the application of opaque bands of material transversely across the smaller dimension of the windows to produce a hatched or cross-hatched effect.

For non-binary codes, more than one level of attenuation may be used.

In a second aspect of the invention, provision is made for reading the code on the card rapidly, in a so-called "swipe" reader which may be attached to a door in much the same manner as a conventional key-operated cylinder lock, the device being so designed as to ensure reliable location of the card in a slot during reading.

Thus the invention further provides a housing for the optoelectronic components required to read a concealed code of a card or badge arranged along a line parallel to one edge of the card, said housing being formed with two internal chambers that accommodate an infra-red light emitting diode and a photosensor respectively, the two chambers being provided with holes disposed on opposite sides of an external slot to facilitate a beam of infrared radiation passing through the holes and across the slot to read the code embodied in the aforesaid card or badge as the edge of the card is advanced through the slot and the surface at the bottom of the slot sloping upwards from the periphery of the housing to a point of maximum height mid-way through the slot that is immediately below the point at which the infra-red beam passes across the slot so that the beam reads the code even when the edge of the card is slightly misaligned.

BRIEF DESCRIPTION OF DRAWINGS

Other features of the invention will be apparent from the appended claims to which attention is hereby directed.

The invention will now be described by way of example only, with reference to the accompanying drawings, in which.

DETAILED DESCRIPTION OF PREFERRED EMBODIMENT

Figure 1:
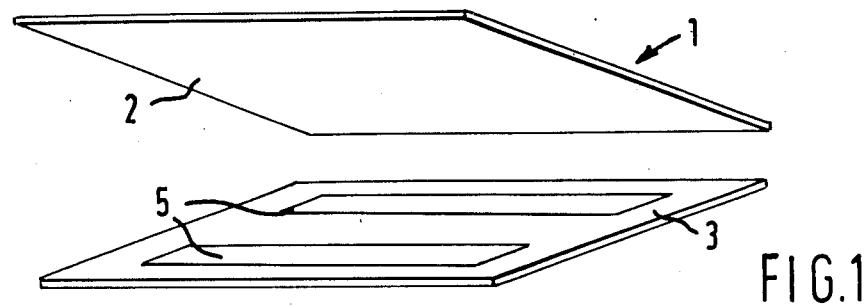
FIG. 1 is an exploded view of the layers of which the plastic card is constructed.

A preferred construction for a plastic data card (1) is illustrated by FIG. 1, which shows the two principal layers (2,3) opened out before being thermally bonded together, to reveal the hidden internal code (5). There is a variety of ways in which the code may be printed. In a preferred embodiment it is produced by hot foil stamping with the aid of a tool with movable segments, each segment being capable of printing in the data track either a clear window (10) for one binary digit value or a window (12) partially obscured by hatched shading bars for the other binary digit value. In a second embodiment, only one window pattern is used, but the second binary digit value is represented by the superposition of a layer of semitransparent film (15) selectively over each window. The required pattern of semitransparent areas may be produced in photographic film applied over the pattern of windows (10) before the plastic layers are bonded together. It will be apparent that the dimensions of the semi-transparent areas can be greater than the dimensions of the windows so that there are wide tolerances in the dimensions of the pattern of the semi-transparent areas that will effectively record the data in the card. The resulting semi-transparent windows are shown in FIG. 2 at (12).

Figure 2:
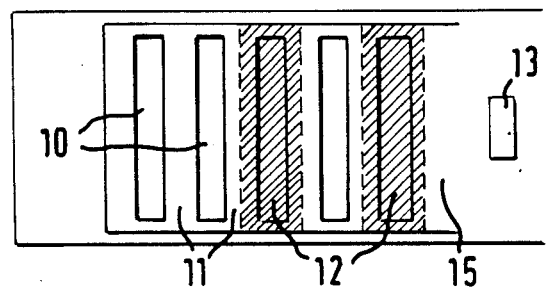
FIG. 2 shows in detail typical dimensions of the windows which represent one binary digit when unobscured and which represent the other binary digit when covered in one embodiment by a semi-transparent film.

FIG. 2 illustrates part of a code track according to the second embodiment. Typically, the height of each window may be 6 mm. and the width 0.5 mm. As will be seen later, if the infra-red beam (13) used to scan the code has dimensions 2 mm. high by 0.4 mm wide, there will be a comfortable latitude in the transverse positioning of the sanning beam as it progresses along the code track, and this makes for trouble-free use of the swipe-reader (20).

The successive windows are separated by opaque strips (11) also typically 0.5 mm wide which ensure that as the scanning beam moves along the code, successive bits will be separated by instants of negligible transmission of the infra red radiation. The amplitude of the maximum transmission will be defined by the area of the scanning aperture, since this is smaller than that of the code windows, but the relative amplitude of signals representing the two binary digits will be dependent on the transparency or relatively lower transmission factor of the successive windows.

Figure 3:
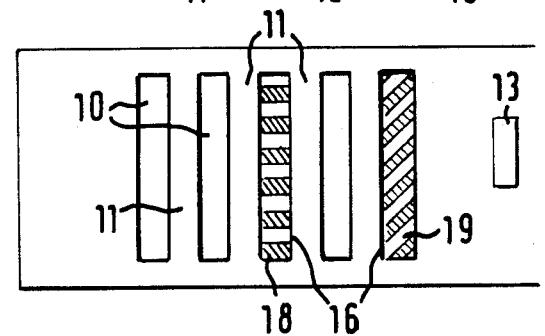
FIG. 3 shows in detail windows as in FIG. 2 some of which have been partially obscured by the application of hatched patterns of opaque lines.

FIG. 3 illustrates part of the code track according to the preferred embodiment. The dimensions of the clear windows (10) are identical to those shown in FIG. 2, but the partially obscured windows are obscured not by the semi-transparent film of windows (12) but by cross hatched shading bars. The shading bars may be perpendicular to the long dimension of the windows as illustrated in window (18) or they may be arranged obliquely as in window (19). In either case the optimum dimensions of the shading bars are 0.5 mm wide with 0.5 mm spaces. The effect of such shading will be to halve the amount of radiation passing through the 2.0 mm × 0.4 mm scanning aperture for any position which it may occupy within the 5.0 mm × 0.5 mm area of the code window (18) or (19).

Figure 4:
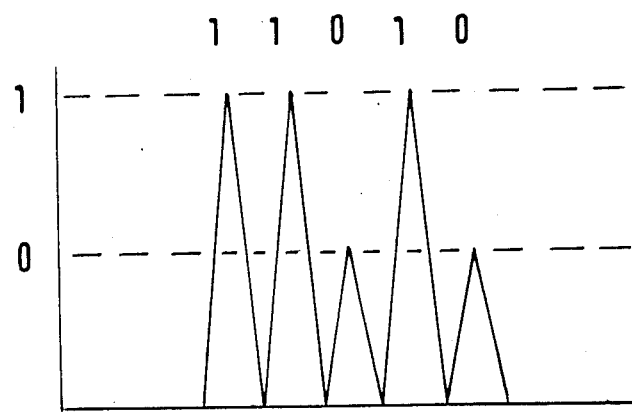
FIG. 4 shows the form of the output current from a phototransistor (FIG. 8) when it responds to the passage of the two types of window between it and the source of infra-red radiation.
Figure 8:
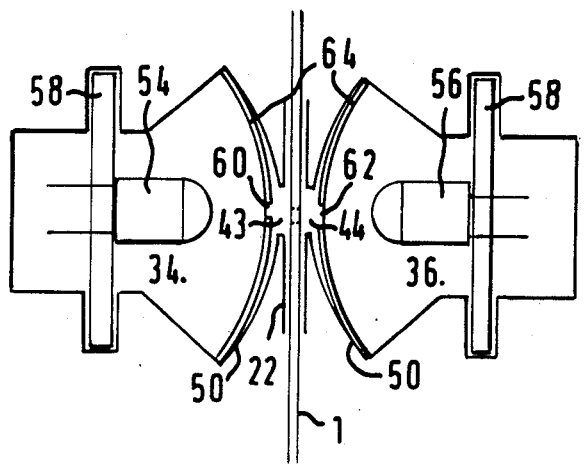
FIG. 8 shows in detail the positioning of the infra-red light source and sensor, their printed circuit boards and slit-defining photographic films.

FIG. 4 illustrates the amplitude of the current output from the phototransistor (56) in FIG. 8 as the successive windows of FIGS. 2 and 3 move through the infra-red scanning beam (13).

FIGS. 5, 7 and 6a, 6b show respectively a top plan an inverted plan and cross-sections on the lines A—A and B—B of a preferred design of housing for the optoelectronic reading arrangement which may be used on or adjacent to a door, attendance recording apparatus, or any other mechanism to which an input is required from the scanning of the coded card (1).

Typically, housing (20) which may be cast from brass or any similar convenient metal, has a diameter of the order of 40 to 50 mm. and a height about 10 to 15 mm. An upper cylinder is divided into two housings (23, 24) by a slot (22) approximately 1.0 mm wide dimensioned to accommodate the edge of the plastic card (1). The two separate housings (23, 24) are maintained in fixed relationship with each other by being integrally formed on a base (28) about 3.0 mm thick at the edges, but hollowed out towards the centre as can be seen in FIG. 6. The two halves of the cylinder are cut away at each end of the central slot (22) for a depth of about 14 mm from their periphery at angles of about 45 degrees from the plane of the slot, in order to provide easy guidance into the slot for a card offered to it from either direction. As will also be apparent from FIG. 6, the inside of the housings (23, 24) are substantially hollow with internal bulkheads whose functions will be described below.

Figure 5:
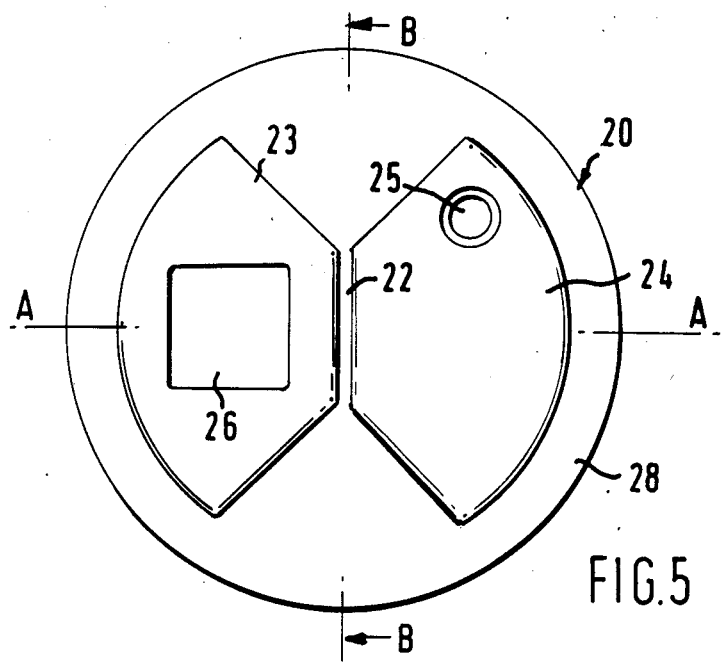
FIG. 5 illustrates in plan view the external appearance of a module that may be attached to a door or wall for the convenience of card holders to enable their coded cards to be readily scanned.
Figure 6A:
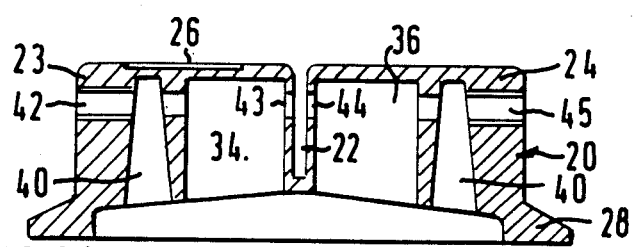
FIGS. 6a and 6b are cross-sections of the module on the lines A—A and B—B shown in FIG. 5 respectively enabling its internal features to be identified and showing the profile of the card insertion section slot.
Figure 6B:
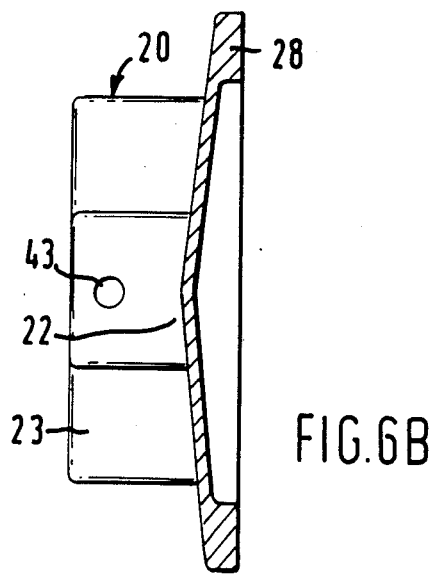

Other features visible in FIG. 5 include an aperture (25) having a diameter typically of 3.0 mm. passing vertically through the entire casting. This is provided to accommodate a light emitting diode lamp which may be used to signal the status of the associated system to the user and to provide response signals indicating for example when the card read by the system has been accepted. A square depression (26) may be provided in part of the upper surface which may typically be 10 mm × 10 mm in dimensions. This is intended to accommodate a label which may identify the owner of the system, the number of a room, or any other plainly visible motif. As shown in FIG. 6b, the surface of the base plate (28) is not horizontal in a plane passing through the slot (22), but slopes by up to 10° from each side to a high point at the middle of the slot (22) so that misalignment of the card does not affect the vertical position at which the card is scanned and so does not prevent the code being read. Immediatedly above this mid-point in the slot, the housing is provided with a diametrical hole (42, 43, 44, 45) typically 2.0 mm in diameter which is threaded near its outer extremeties to accommodate fixing screws. At its mid-section the hole is drilled clear to provide apertures (43, 44) through which the infra-red light beam can pass from an infra-red light emitting diode housed in chamber (34) in one side of the housing to the phototransistor or photodiode housed in chamber (36) in the other side of the housing (24). The 2.0 mm diameter of these holes define the 2.0 mm scanning aperture to which reference was made above.

Figure 7:
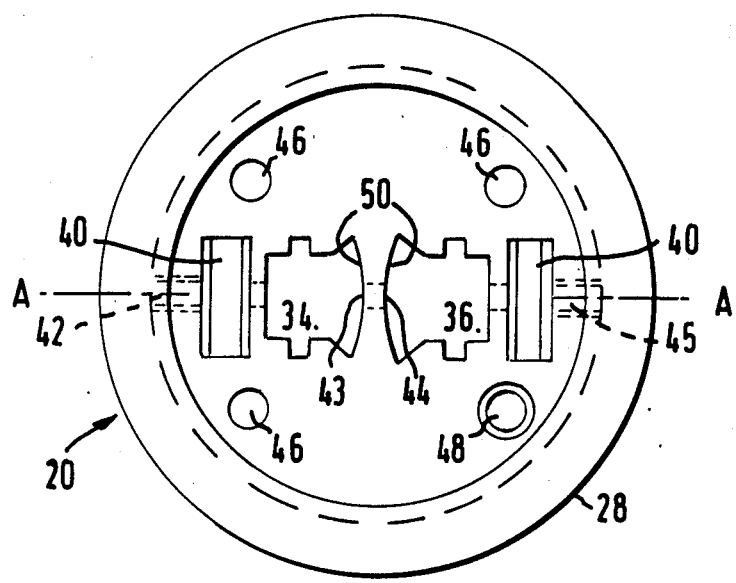
FIG. 7 is an inverted plan view showing the underside of the module shown in FIGS. 5 and 6.

Other details of the casting (20) are visible in the view shown in FIG. 7.

The hole (25) already described can be seen emerging from the underside of the casting at (48). In this view it can be seen that the lower half of this hole has a larger diameter than the upper half, this facilitates the fitting of a readily available standard light emitting diode lamp with sufficient space to accommodate its wire leads. Three similar holes (46) symmetrically spaced relative to hole (48) are threaded and may be used for attaching the module to a door panel or other surface to which access is available from the far side.

Two slots (40) 10 mm long by about 3.0 to 4.0 mm wide are located near the outer walls of the cylindrical housings (23, 24) extending from the base of the moulding to above the drilled hole (42, 45). When it is intended to attach the module to a wall or other surface not easily accessible from behind, two rectangular lugs of dimensions compatible with those of these slots (40) may be secured to the wall by any appropriate means, their centres being 25 mm apart to match the spacing between slots (40). When the fully assembled module is offered up to mate with these lugs, a pair of grub screws may be used in the threaded sections of the holes (42, 45) to secure the assembly to the lugs. The tops of the grub screws may be concealed if required, by a coat of varnish or a band of adhesive tape.

The two remaining chambers (34, 36) in the hollow housings (23, 24) are provided to accommodate the infrared light emitter (54) and the phototransistor (or photodiode) (56). These two components are mounted on carriers (58) of 1/16 inch printed circuit board each ⅜ inch square, to which the wire leads of the two devices are connected to form anchorages for the electrical conductors connecting the module with its associated electronic system. The positions of the two components (54, 56) are arranged to align precisely with the holes (43, 44) in the walls separating the chambers (34) and (36) from the slot (22). These holes therefore define the position of the scanning beam. However, while a diameter of 2.0 mm is satisfactory for the larger dimension of the scanning beam, this would not be narrow enough in the direction of scan of the code, to give sufficient resolution. Therefore it is arranged to provide two small sheets of exposed photographic film (64) opaque to infrared except for transparent strips respectively 0.4 mm wide and about 0.6 mm wide. The narrower of these slits (60) is fitted into the concave surface (50) adjacent to the infra-red light emitting diode (54) to define the width of the apparent light source, and the other (62) is similarly fitted into the concave surface (50) beside the sensor (56) partly to assist in defining the width of the infra-red light beam but also to prevent reflected radiation from the walls of the holes (43, 44) being received at the sensor.

I claim:

1. A housing for the optoelectronic components required to read a concealed code of a card or badge arranged along a line parallel to one edge of the card, said housing being formed with two internal chambers that accommodate an infra-red light emitting diode and a photosensor respectively, the two chambers being provided with holes disposed on opposite sides of an external slot to facilitate a beam of infra-red radiation passing through the holes and across the slot to read the code embodied in the aforesaid card or badge as the edge of the card is advanced through the slot and at the surface at the bottom of the slot sloping upwards from the periphery of the housing to a point of maximum height mid-way through the slot that is immediately below the point at which the infra-red beam passes across the slot so that the beam reads the code even when the edge of the card is slightly misaligned.

2. A housing as claimed in claim 1, wherein the diameter of the holes defining the apertures between the two chambers is selected to define the longer dimension of the infra-red scanning beam.

3. A housing as claimed in claim 1 in which the slot is provided at each end with tapered means for leading the card into the slot.

4. A housing as claimed in claim 3 wherein the surface at the bottom of the slot slopes at an angle of less than ten degrees, whereby the card cannot be presented to the slot at an excessively steep angle.

5. A housing as claimed in claim 1, provided with concealed means for securing it to a door panel or to a wall.

6. A housing as claimed in claim 1, of a shape and size such that it may be conveniently fitted to a door or similar surface and operated by presentation of a coded plastic card to output a control signal effective to enable a door lock to be released.

7. A card or badge carrying concealed digital information for presentation to an electronic recognition device to cause said device to produce an authorisation signal denoting recognised information wherein the digital information on the card is invisible to the naked eye when viewed in visible light but is readable in transmission by an optoelectronic reader using infra-red radiation and is recorded by successive binary digits being represented by transparent windows alternating with regions opaque to infra-red radiation, the said windows and opaque regions being arranged along a line parallel to one edge of the card, each window representing a binary digit of the code with one binary digit being represented by first generally rectangular windows of higher transmissivity and the other binary digit being represented by windows of substantially the same dimensions as the first windows but whose transmissivity is lower.

8. A card or badge as claimed in claim 7, wherein the reduced light transmission representing the second binary digit value is brought about by the application of a photographic or other partially transparent film over the row of windows such that the light transmission is reduced in the partially obstructed windows to about half the light flux of the unobstructed windows.

9. A card or badge as claimed in claim 7 wherein the reduced light transmission representing the second binary digit value is brought about by the printing of shading bars across the narrow dimension of the unobstructed rectangular windows in order to reduce by a factor of about two, the light flux passing through the windows.

10. A card or badge as claimed in claim 9 wherein the shading bars are oriented perpendicular to the long dimension of the unobstructed windows and have a width and pitch both of which are submultiples of the long dimension of the scanning aperture.

11. A card or badge as claimed in claim 9 wherein the shading bars are oriented at an oblique angle to the long dimension of the unobstructed windows and whose pitch measured in a direction parallel to the long dimension of the unobscured windows is a submultiple of the long dimension of the scanning aperture.

* * * * *